US007822208B2

(12) United States Patent
Calvez et al.

(10) Patent No.: US 7,822,208 B2
(45) Date of Patent: *Oct. 26, 2010

(54) PROCESS FOR CREATING AND MANAGING AT LEAST ONE CRYPTOGRAPHIC KEY, AND SYSTEM FOR ITS IMPLEMENTATION

(75) Inventors: Pierre Calvez, Rueil Malmaison (FR); Brigitte Courtaux, Rueil Malmaison (FR); Jacques Lebastard, Fontenay le Fleury (FR)

(73) Assignee: EVIDIAN, Les Clayes Sous Bois (FR)

( * ) Notice: Subject to any disclaimer, the term of this patent is extended or adjusted under 35 U.S.C. 154(b) by 865 days.

This patent is subject to a terminal disclaimer.

(21) Appl. No.: 11/723,372

(22) Filed: Mar. 19, 2007

(65) Prior Publication Data

US 2009/0327707 A1    Dec. 31, 2009

Related U.S. Application Data

(63) Continuation of application No. 09/461,010, filed on Dec. 15, 1999, now Pat. No. 7,209,563.

(30) Foreign Application Priority Data

Dec. 15, 1998    (FR)    .................................. 98 15800

(51) Int. Cl.
*H04L 9/00*    (2006.01)
(52) U.S. Cl. ....................... 380/278; 380/277; 380/279; 713/155
(58) Field of Classification Search ................... 718/101
See application file for complete search history.

(56) References Cited

U.S. PATENT DOCUMENTS

| 5,606,617 | A | * | 2/1997 | Brands | ........................ 380/30 |
| 5,768,389 | A |   | 6/1998 | Ishii |   |
| 6,105,131 | A | * | 8/2000 | Carroll | ....................... 713/155 |
| 6,324,645 | B1 |  | 11/2001 | Andrews et al. | |
| 6,330,671 | B1 |  | 12/2001 | Aziz | |

(Continued)

FOREIGN PATENT DOCUMENTS

WO    WO 96 12362 A    4/1996

(Continued)

OTHER PUBLICATIONS

Mitchell C. et al. "CCITT/ISO Standards for Secure Message Handling", IEE Journal on Selected Areas in Communications, vol. 7, No. 4, May 1, 1999, pp. 517-524, XP000007972, ISSN 0733-8716, p. 519, Col. 2, p. 522, col. 2.

(Continued)

*Primary Examiner*—Ponnoreay Pich
(74) *Attorney, Agent, or Firm*—Miles & Stockbridge P.C.

(57) ABSTRACT

A process for creating and managing pairs of asymmetrical cryptographic keys and/or certificates associated with the pairs of keys, each pair of keys and associated certificates being intended for an object managed by a computer system. The process includes creating an individual request for creating and/or certifying at least one pair of keys for an object of the system that lacks a pair of keys or a certificate for its pair of keys.

12 Claims, 2 Drawing Sheets

U.S. PATENT DOCUMENTS

| | | |
|---|---|---|
| 6,336,186 B1 | 1/2002 | Dyksterhouse et al. |
| 6,370,249 B1 | 4/2002 | Van Oorschot |
| 6,401,203 B1 | 6/2002 | Eigeles |

FOREIGN PATENT DOCUMENTS

| | | |
|---|---|---|
| WO | WO 98 25375 A | 6/1998 |

OTHER PUBLICATIONS

Hill, J., "trusted Third parties and the Provision of Encryption Services", Computers and Law Apr.-May, 1997.

Schneier, Bruce, Applied Cyptography. Oct. 18, 1995. John Wiley and Sons Inc. $2^{nd}$ Edition. pp. 183-184, section 8.10.

* cited by examiner

PROCESS FOR CREATING AND MANAGING AT LEAST ONE CRYPTOGRAPHIC KEY, AND SYSTEM FOR ITS IMPLEMENTATION

CROSS-REFERENCE TO RELATED APPLICATION

This application is a continuation of application Ser. No. 09/461,010 filed Dec. 15, 1999 now U.S. Pat. No. 7,209,563.

The present invention concerns the field of secure computer systems, and more particularly, cryptographic keys. It relates to a process for creating and managing at least one cryptographic key, and the associated certificate in the case of a pair of asymmetrical cryptographic keys, and a computer system for its implementation.

The present invention more particularly concerns the field of symmetric key cryptography, as well as the field of asymmetric key cryptography.

THE PRIOR ART

Cryptography makes it possible to secure and protect access to electronic documents using encryption and signature functions.

Encryption is the transformation of data (plain text) into a form that is unreadable (encrypted text) for a person who does not know the decryption method, by means of a parameterizable function called the encryption key. Conversely, it is necessary to have the decryption key in order to transform an encrypted text into a plain text.

Signature is a means of authentication that allows the recipient to verify the source and the integrity of a received message. It also uses the key principle mentioned above.

In a multi-user environment, encryption and signature increase the security of communications through unprotected lines like, for example, the Internet.

There are known secure computer systems in which the encryption keys are created individually by an administrator, possibly at the initiation of a user. Thus, when a new user wishes to integrate the secure system and have keys, he requires the creation of one or more keys by the administrator. Upon receipt of the request, the administrator creates a key for the user in question.

This results in an increase in complexity when the number of users increases, and consequently a substantial wait to obtain a key. The user integrating a secure system is forced to wait in order to obtain a key and communicate in a protected fashion in said system.

A key is symmetrical when it is used both to generate and to decrypt the encrypted text.

Asymmetric keys are called public/private keys; the key used to encrypt the information is different from that used to decrypt it. The public key is conveyed in a certificate. The certificate is obtained from a Certification Authority (CA).

The certification of a public key by a certification authority outside the secure system in question increases complexity in the management of the users and their keys and certificates. Furthermore, the secure system quite often communicates with the certification authority in an offline mode, which increases the degree of complexity.

The user has no knowledge of the status of the creation and certification of his keys, and particularly of any deadlock that may occur while they are in progress.

The certificate has a validity period after which it must be renewed. The user who does not watch for the expiration time of his certificate may find himself unable to use his public key. When the certificate of his public key is no longer valid, the user must request a new certification and is forced to wait for the issuing of a certificate by the certification authority before he can again communicate in a protected fashion in the system.

When a user suspects that a third party has gained knowledge of his private key, or when a user changes his name or certification authority, the user can request the revocation of the certificate for his pair of keys.

The certification authority revokes the certificate at the request of the user in question, and the user can then request a new certificate or a new pair of keys and an associated new certificate.

Just like the creation of keys, the certification, and more particularly the communication with the certification authority, becomes increasingly difficult for an administrator to manage when the number of users of the system increases.

One object of the present invention is to simplify the procedure for creating pairs of keys and for certifying public keys, and to reduce the wait for obtaining a pair of keys and/or a certificate.

Another object of the invention is to simplify certification in a system that communicates with a certification authority in an asynchronous mode.

Another object of the invention is to know the status of the procedure for creating a pair of keys as well as that for certification.

Another object of the invention is to facilitate the renewal of expired certificates and of pairs of keys whose certificate has been revoked.

SUMMARY OF THE INVENTION

In this context, the present invention proposes a process for creating and managing pairs of asymmetrical cryptographic keys and associated certificates, each pair of keys being intended for a subject managed by a computer system, characterized in that it consists of:
  searching in storage means for at least one subject for which a pair of asymmetric keys and an associated certificate must be created;
  creating at least one individual request for creating and certifying a pair of asymmetric keys for said subject;
  transmitting said individual creation and certification request to a key generating center, which issues a pair of asymmetric keys in accordance with said request;
  creating at least one individual request for certifying the public key created for said subject;
  transmitting said individual certification request to a certification authority, which issues a certificate in accordance with said request.

The present invention also proposes a process for creating and managing public key certificates, each certificate being intended for a public key of a subject managed by the computer system, characterized in that it consists of:
  searching in storage means for at least one pair of asymmetric keys for the public key for which a certificate must be created;
  creating at least one individual request for certifying the public key;
  transmitting said individual certification request to a certification authority, which issues a certificate in accordance with said request.

The present invention also relates to a process for creating and managing symmetrical cryptographic keys, each key being intended for a subject managed by a computer system, characterized in that it consists of:

searching in said storage means for at least one subject for which a symmetric key must be created;

creating at least one individual request for creating a symmetric key for said subject;

transmitting a request corresponding to said individual creation request to a key generating center, which issues a symmetric key in accordance with said request.

The present invention also relates to a computer system that makes it possible to create and manage pairs of asymmetrical cryptographic keys and/or certificates associated with the pairs of keys, the pairs of keys and the certificates being intended for a subject managed by said system, characterized in that it comprises means for automating the creation and/or certification of at least one pair of keys for each subject managed by the system.

The present invention also proposes a computer system that makes it possible to create and manage symmetrical cryptographic keys, the keys being intended for a subject managed by said system, characterized in that it comprises means for automating the creation of at least one key for each subject managed by the system.

PRESENTATION OF THE FIGURES

Other characteristics and advantages of the invention will become clear in light of the following description, given as an illustrative and non-limiting example of the present invention in reference to the attached drawings, in which.

DESCRIPTION OF A PREFERRED EMBODIMENT OF THE INVENTION

The embodiment of the invention described below relates to the creation and management of pairs of asymmetrical cryptographic keys and the associated certificates. The principle of the invention is also applicable to the creation and management of symmetrical cryptographic keys.

The principles of public/private key cryptography are briefly summarized below.

Each user has a pair of asymmetric keys, one public key and one private key.

The private key is personal, known and kept secret by the only legitimate holder of this key, who uses it to decrypt received messages or to sign messages. The public key is made public: it is known by everyone and is used to encrypt documents or to verify signatures. To sign a document, a user uses his private key; the private key being secret, only said user can sign a document using this key. Anyone can verify the signature of the said user using said user's public key. To encrypt a document, anyone can use a user's public key. Said user decrypts the document using his private key, which only he knows.

It is necessary to provide a system that makes it possible to verify that a given public key is actually associated with the legitimate holder and that it is really him who is using it.

This problem gave rise to certificates. A certificate is a digital document attesting to a person's ownership of a public key. Such a certificate must be issued by a recognized institution, called a certification authority (CA). The certificate allows the holder to prove to anyone that the public key associated with this certificate belongs to him and that he will be able to decrypt the messages that any person sends to him using this public key. When a person signs and sends a document, the recipient obtains the certificate of the sending person. The recipient can verify the veracity of the certificate with the certificate from the certification authority; he can then verify the signature of the sender.

A certificate generally comprises the following elements:

the public key;

the name of the owner;

the expiration date of the certificate;

the name of the certification authority;

the serial number of the certificate;

the signature of the certification authority.

Figure 1:
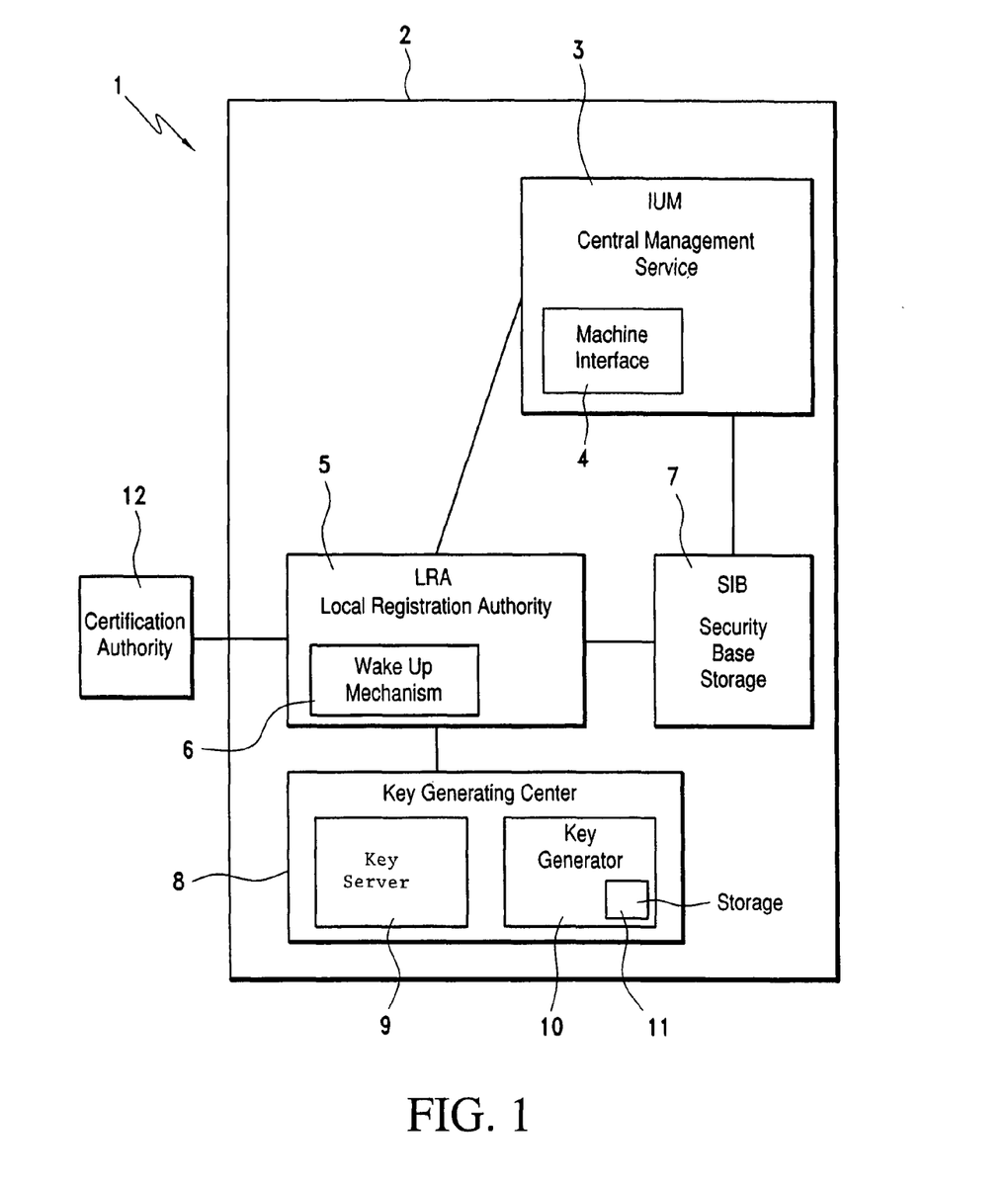
FIG. 1 is a simplified global diagram of the computer system according to the present invention.

As illustrated in FIG. 1, the computer system 1 according to the present invention includes a server 2 or a workstation or any other equivalent known means. The server 2 comprises at least:

a central management service 3 IUM (Integrated User Management). The central management service 3 includes a man/machine interface 4;

a local registration authority 5 (LRA) comprising a periodic wakeup mechanism 6 for periodically activating the local registration authority 5;

a reference central security base 7 (SIB, Security Information Base);

a key generating center 8 comprising a key server 9 and a key generator 10. The key generator 10 includes storage means 11 consisting in a memory space or hard disk or any other equivalent known type of storage means.

The computer system 1 also has access to at least one certification authority (CA) 12.

According to another embodiment of the invention, the server does not contain the key generating center 8. The computer system 1 has access to a key generating center 8 outside the server 2. It is possible, for example, for the certification authority 12 to have a key generating center 8 used by the system 1 to create its keys.

The central management service 3 is a process activated at the request of an administrator or user.

The local registration authority 5, the periodic wakeup mechanism 6, the key server 9 and the key generator 10 are demons running as background tasks.

In the sense of the present description, a demon is a process that is created at the system startup or at dates set by the system administrator, and that is only interrupted when the system is turned off. A process is a program currently running at a given instant, the program itself constituting an inert object stored in a reserved memory space or the equivalent. It corresponds to a logical sharing of the work in the operating system of the server 2. The activity in a system is generated by the processes. Memory spaces or any other known storage means are reserved for the storage of programs corresponding to the above-mentioned demons.

The central security base 7 is a relational database, an object-oriented database, a directory or any other means for storing and sequencing data.

The certification authority 12, in the embodiment described, consists in a remote workstation, a remote server of any other equivalent means capable of working in the offline mode (disconnected from the server 2) or in the online mode (connected to the server 2). The exchanges between the server 2 and the certification authority 12 are secure; the local registration authority 5 and the certification authority 12 each specifically have a pair of keys that enables them to sign their exchanges.

The exchanges between the local registration authority 5 and the key generating center 8 are secure; they belong to the same server 2 and use a proprietary protocol specific to the server 2 in order to dialog.

The computer system 1 according to the present invention manipulates the following objects:
geographic unit/organizational unit;
user;
application;
certification authority;
model pair of keys;
model certificate;
certificate extension;
multiple requests for creating and certifying pairs of keys;
pair of keys;
multiple requests for certifying public keys;
certificate.

According to one particular embodiment of the invention, the system also manipulates the object:
request for revocation of a certificate.

The objects "user" and "application" are also called subjects. Each object or subject comprises attributes that characterize it.

Figure 2:
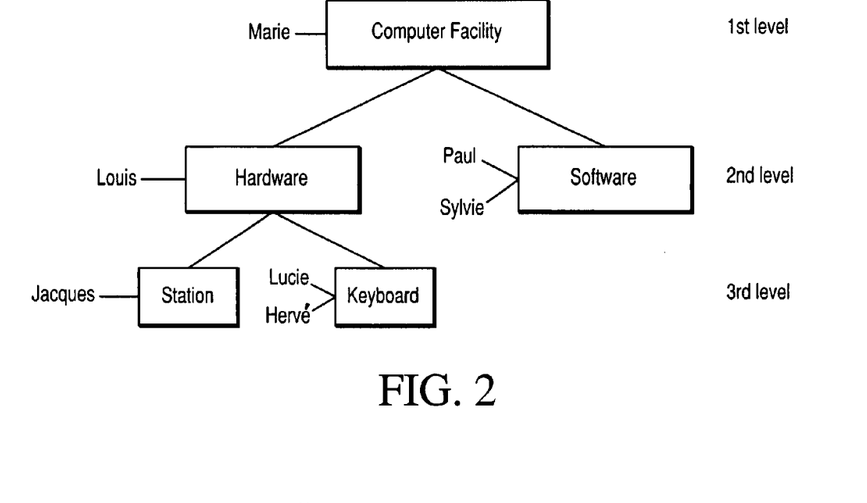
FIG. 2 represents an organizational unit in the form of a tree.

The objects "geographic unit/organizational unit" are for describing users or applications based on geographic or organizational criteria; any other type of criteria for defining a set of users or applications can be used. FIG. 2 represents an exemplary organizational unit in the form of a tree. In this example, the organizational unit relates to a computer facility of a company. The object "geographic unit/organizational unit" comprises as attributes the multiple requests for creating and certifying pairs of keys and the multiple requests for certifying public keys.

The subjects "user" and "application" respectively represent a physical person and an application, both of which use pairs of keys. In FIG. 2, Marie, Louis, Jacques, etc., are user subjects (physical persons). The subjects "user" and "application" have attributes that contain the information required for their identification in the object "certificate," such as a name in accordance with the RFC 822 standard, information for the extension of certificates defined by the administrator. The subjects "user" and "application" also have as attributes pairs of keys and multiple creation and certification requests. A subject can have several pairs of keys, each pair of keys corresponding to a different specific use, for example a pair of keys used for encryption and a pair of keys used for signature.

The object "certification authority" represents the certification authority 12, which certifies public keys and issues certificates with extensions and which also revokes certificates at the request of a user or an administrator. The certificate format recognized today is defined by CCITT recommendation X.509 V3. The certificates can be read or written by any X.509-compatible software. The attributes of the object "certification authority" are the name and address of the authority in question, the model certificates issued by the authority, the certificates issued by the authority, and the certificate of the certification authority in question.

The object "model pair of keys" has as attributes the algorithm to be used with the pair of keys, the length of the keys, the multiple creation and certification requests, and the possible use for the pair of keys, for example data signature, key encryption or certificate signature. It makes it possible to define a family of pairs of keys used by subjects of the same geographic, organizational or other unit, and thus to construct a multiple request for a given unit, as will be seen below.

The object "model certificate" has as attributes the certification authority, the validity period, the extensions, the multiple creation and certification requests, and the multiple certification requests. A subject may have several certificates issued by different certification authorities for the same pair of keys. The object "model certificate" makes it possible to define a family of certificates used by subjects of the same geographic, organizational or other unit and thus to construct a multiple request for a given unit, as will be seen below.

The object "extension" defines additional data entered into the certificate. The object "extension" comprises as attributes an identifier, a flag indicating whether or not the extension is critical, attributes of objects that will contain the data to be entered into the extension, an encoding rule that makes it possible to encode the data entered into the certificate. The object "attributes," which will contain the data to be entered into the extension, can be chosen from the attributes of the subjects, the certification model, the certification authority, the multiple certification request or the extension. The object "extension" also comprises as an attribute the model certificates.

Thus, for example, the extension of a certificate could contain a particular identifier, a non-critical flag, a user's age and an encoding rule.

The multiple request for creating and certifying public keys comprises an attribute defining a set of "key user" subjects. The subjects in the set are explicitly named, or searched for based on preset criteria such as geographic or organizational criteria. Thus, for example, the set in the multiple request relative to the computer facility in FIG. 2 is defined in the form of a tree. It is also possible to have one multiple request per level, and to explicitly name all of the users for the level in question. For example, the set of a multiple request for the keyboard sub-unit comprises the users Hervé and Lucie, explicitly named or determined based on organizational criteria, i.e., all the subjects belonging to the keyboard sub-unit. The object "multiple request for creating and certifying pairs of keys" also has as attributes the model pair of keys and the model certificate to be used, information that makes it possible to know the conditions under which it is necessary to create keys (lack of keys for a user and of a corresponding individual creation and certification request, creation requested by an administrator, revocation of a certificate and creation requested after this revocation). It also comprises a scheduling attribute. The scheduling attribute indicates the date as of which the multiple request in question should be executed, and whether the request should be executed only once. If the scheduling attribute reveals that the certification request should not be executed just once, the request is executed with each call by the system, and more precisely by the periodic wakeup mechanism 6, until the system shutdown. The object "multiple request" also comprises an attribute relative to the status of the creation. The attribute relative to the status of the creation has values such as "pending," "in progress," "sending a creation request," "done," "process ended with an error message."

The object "individual request for creating and certifying a pair of keys" corresponds to the object "multiple request" in which an individual subject is identified.

The object "pair of keys" contains as attributes the holder of the pair of keys, the values of the public and private keys, the algorithm to be used with the pairs of keys, the length of the keys, the type of use for the keys, the creation date of the keys, the associated certificates, the multiple certification requests. Several certificates issued by different certification authorities can be associated with the same pair of keys.

The object "multiple request for certifying public keys" has as attributes a set of public keys to be certified, which belong to subjects explicitly named or defined by geographic, organizational or other criteria. The object "multiple request for certifying public keys" also comprises as attributes the model certificate to be used, information that makes it possible to know the conditions under which it is necessary to certify a key such as, for example, the lack of a certificate and an individual certification request, certification requested by an administrator, the expiration of the validity period of the certificate, the revocation of a certificate for a pair of keys and certification request for said pair of keys that the user wishes to keep after the revocation, etc. The multiple request is preferably executed before the certificate in question has expired. Thus, the embodiment described provides for the certification of all the public keys whose certificates expire during the period of activation of the local registration authority 5. The period of activation of the local registration authority by the periodic wakeup mechanism 6 is, for example, twice as long as that required on average for the certification authority to issue a certificate. If, for example, the certification authority takes an average of five days to certify a public key, the activation period of the local registration authority is ten days; thus, if a certificate expires seven days after the activation of the local registration authority by the mechanism 6, said certificate expires within the ten-day activation period of the local registration authority, and a new certificate must be requested from the certification authority. If the certification authority takes, for example, five days to send this new certificate, a new certificate will be ready five days after the activation of the local registration authority and two days before the expiration of the old certificate. The user in question will therefore always have a certificate at his disposal; the renewal will be transparent for him. The object "multiple request for certifying public keys" also contains an attribute relative to the status of the certification. The attribute relative to the status of the certification has values, for example the values "pending," "in progress," "sending creation request," "done," "process ended with an error message."

The object "individual public key certification request" corresponds to the object "multiple request," in which only one public key, and hence only one pair of keys, is identified.

The object "certificate" has as attributes the holder of the certificate, the associated pair of keys, the issuing certification authority, the value of the certificate and the validity period.

If an object "request for revocation of a certificate" is provided, said object comprises the following attributes: the certificates and/or the certification authority in question, the status, the cause of the revocation (a user's suspicion that his key has become known to a third party, change in the holder's identity). The revocation request also indicates whether a pair of keys should be created after said revocation or whether the pair of keys for which the certificate has been revoked should be retained and re-certified. The processing of the revocation will not be described below, but the basic principle of an adapted request is the same as for the creation and the certification.

All of the objects and subjects, as well as the links between them, are stored in the central security base 7. Each object and subject in the central security base 7 has a unique identification and is accessible by the administrator through the man/machine interface 4.

The local registration authority 5 is represented in the central security base 7 in the form of a subject of the application type. The local registration authority 5 has a pair of keys stored in the base 7 during the installation of the system according to the invention. The pair of keys of the local registration authority 5 is used to protect exchanges between the local registration authority 5 and the certification authority 12. The certification authority 12 also has a pair of keys for protecting its exchanges with the local registration authority 5.

According to one particular embodiment of the invention, only the public key is stored in the central security base. The object "pair of keys" contains only the value of the public key. The private key can be, for example, integrated into a chip card.

The administrator of the system 1, using the man/machine interface 4, enters information specific to the environment into which the system 1 is integrated. The administrator defines the subjects in question, for example based on geographic, organizational or other criteria. He declares the model certificates, the model pairs of keys, the certification authorities, the certificate extensions. He defines multiple creation and certification requests and multiple certification requests for sets of subjects, including those defined above. The central management service 3 creates the corresponding objects or subjects by defining their attributes from the specific information entered. The objects and subjects created are stored in the central security base 7.

It is also possible to import, per program, objects or subjects such as, for example, the subject "user" or the object "pair of keys" or "certificate," and to store them in the central security base 7 in the form described above.

The central security base 7 is managed and updated by the central management service 3.

The administrator can, at any time, through the man/machine interface 4, enter new subjects, new requests for creating pairs of keys and/or new certification requests, or any other object, which is then stored in the central security base 7.

The process according to the present invention consists of:
 searching in the central security base 7 for at least one subject for which a pair of asymmetric keys and an associated certificate must be created;
 creating at least one individual request for creating and certifying a pair of asymmetric keys for said subject;
 transmitting a request corresponding to said individual creation and certification request to the key generating center 8, which issues a pair of asymmetric keys in accordance with said request;
 creating at least one individual request for certifying the public key created for said subject;
 transmitting a request corresponding to said individual certification request to the certification authority 12, which issues a certificate in accordance with said request.

The search in the central security base 7 is performed periodically. The periodic wakeup mechanism 6 periodically activates the local registration authority 5. The activation period of the local registration authority 5 can be modified by the administrator.

According to one particular embodiment of the invention, the local registration authority 5 activated by the periodic wakeup mechanism 6 searches for all the multiple requests for creating and certifying pairs of keys stored in the central security base 7 wherein the scheduling attribute corresponds to an execution date that has arrived or passed. The local registration authority 5 gives the attribute relative to the status of the multiple requests found the value "pending." In FIG. 3, a multiple request for creating and certifying the keyboard unit has been found.

Figure 3:
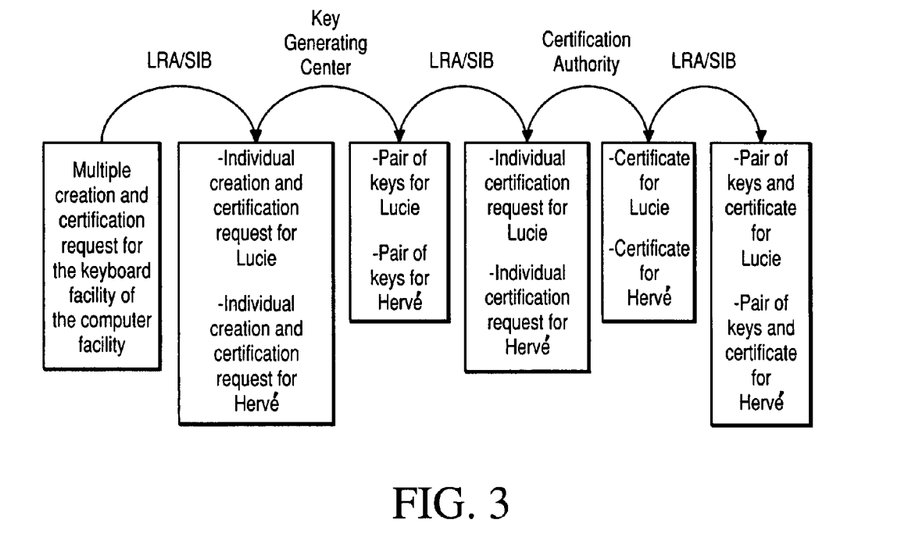
FIG. 3 represents a diagram of steps in the process according to one embodiment of the present invention, applied to a part of the organizational unit represented in FIG. 2.

For each of the multiple creation and certification requests found, the local registration authority 5 searches for all of the subjects involved in the request in question for which a pair of keys must be created, and more precisely, for which a condition under which it is necessary to create at least one pair of keys is fulfilled (lack of a pair of keys and a corresponding individual creation and certification request for the subject in question, revocation of a certificate and creation requested after this revocation). The condition "creation requested by an administrator" is only considered when an administrator requests the immediate creation of a pair of keys through the man/machine interface, as will be seen below. For each subject found, the local registration authority 5 creates an individual request for creating and certifying a pair of keys from the multiple request in question. To do this, the local registration authority 5 communicates with the central security base 7. It retrieves from the central security base 7 the information it needs to construct each of said individual requests, including the model pair of keys and the model certificate given in the multiple creation and certification request. In FIG. 3, two individual requests are created for each user of the keyboard unit lacking a pair of keys, in this case Hervé and Lucie. It gives the attribute relative to the status of the individual request in question the value "in progress."

Several individual requests for creating and certifying a pair of keys can be created for a given subject. Each individual request corresponds to a specific use for of the pair of keys (data signature, key encryption or certificate signature, etc.) and hence to a particular model pair of keys. Each individual request can also correspond to a given certification authority and hence to a particular model certificate.

The administrator can, at any time, request the creation and certification of a pair of keys for a given subject through the man/machine interface 4; the administrator enters all the information necessary to the creation of an individual creation request and an associated individual certification request, including the model pair of keys and the model certificate; the authority can then directly create said individual creation request and the corresponding certification request for the given subject. The conditions "creation requested by an administrator" and "certification requested by an administrator," in which it is necessary to create at least one pair of keys and one certificate, are fulfilled. The local registration authority gives the attribute relative to status of the individual request in question the value "in progress." The process then works as described below for the individual creation and certification request derived from a multiple request.

For each individual creation and certification request created, the local registration authority 5 sends a corresponding request for a pair of keys to the key generating center 8, and more specifically to the key server 9. The content of the creation request corresponds to that of the individual creation and certification request; only its structure is modified so as to be adapted to the communication means used between the local registration authority 5 and the certification authority 12.

Once the request is transmitted, the local registration authority 5 gives the attribute of the individual creation and certification request relative to the status of the creation the value "sending a request."

The key generator 10 continuously produces pairs of keys in accordance with the given algorithms and key sizes and stores them in the storage means 11 of the generator.

The key server 9, upon receiving the request from the local registration authority 5, extracts from the storage means 11 of the key generator 11 a key of the type defined in the request sent by the local registration authority 5. The key server 9 transfers the extracted pair of keys to the local registration authority 5.

In the event that the generator 10 does not succeed in creating a key, it transmits an error message to the local registration authority 5. The local registration authority 5 changes the value of the attribute of the individual request in question relative to the status of the creation to give it the value "process ended with an error message."

Upon reception of the pair of keys issued by the key server 9, the local registration authority 5 creates a corresponding object "pair of keys" in the central security base 7. The local registration authority 5 stores the pair of keys created in this base. In FIG. 3, two pairs of keys are stored in the local security base 7, one for Hervé and the other for Lucie. The local registration authority 5 changes the value of the attribute relative to the status of the creation of the individual request in question to give it the value "process done."

The local registration authority 5 destroys the individual creation request associated with the subject in question and creates an individual request for certifying the corresponding public key created.

The local registration authority 5 retrieves from the central security base 7 the information it needs to construct each of said individual certification requests, including the model certificate given in the multiple creation and certification request. The model certificate specifically contains the certification authority and the extensions. From the extensions, the local registration authority 5 obtains the encoding rules that make it possible to encode the data to be entered into the certificate. It applies said rule in order to encode each extension into the certificate contained in the individual certification request in question. The condition "no certificate," in which it is necessary to create at least one pair of keys, is fulfilled. The local registration authority 5 changes the value of the attribute of the individual request in question relative to the status of the certification to give it the value "in progress." In the example represented in FIG. 3, two individual certification requests are created for the two public keys of the pairs of keys created for Hervé and Lucie, respectively. Several individual requests for certifying pairs of keys can be created for a given subject, each request corresponding to a given certification authority and hence to a particular model certification.

Once the individual requests have been created for each subject, the local registration authority 5 deletes from the central security base 7 the object "multiple request for creating and certifying pairs of keys" in question when the scheduling attribute requires it, i.e., when it indicates that the multiple request in question should be executed only once.

The local registration authority 5 sends one certification request per individual certification request created to the certification authority 12 in question. The content of the certification request corresponds to that of the individual certification request; only its structure is modified so as to be adapted to the communication means used to connect the local registration authority 5 to the certification authority 12. The certification request is signed with the private key of the local registration authority 5 in order to guarantee the source of the request. The status of each certification request is then updated; the local registration authority 5 gives the attribute of the individual certification request relative to the status of the procedure the value "sending a request." The certification authority 12 stores the request. The certification authority 12 is capable at any time of producing a certificate signed with its private key. The connection mode between the certification authority 12 and the local registration authority 5 may be synchronous or asynchronous. In an asynchronous mode, the local registration authority 5 comprises means for processing certificates as they are received. Upon reception of the certificate in question, the local registration authority 5 changes the value of the attribute of the individual request in question relative to the status of the certification to give it the value "done." The local registration authority 5 destroys the individual certification request in question and creates an object of the certificate type in the central security base 7. In the example of FIG. 3, two certificates are stored, respectively, for Hervé and Lucie.

In the event that the certification authority 12 does not succeed in creating, or refuses to create, a certificate, it transmits an error message to the local registration authority 5. The local registration authority 5 changes the value of the attribute of the individual request in question relative to the status of the certification to give it the value "process ended with an error message."

The subjects stored in the central security base 7 that do not have any pairs of keys, or for whom a pair of keys has been requested by the administrator, or whose certificate has been revoked and whose new pair of keys has been requested after this revocation, are automatically equipped by the process and the system according to the invention with pairs of keys and associated certificates.

The process according to the present invention also consists of:
  searching in storage means 7 for at least one pair of asymmetric keys for the public key for which a certificate must be created;
  creating at least one individual request for certifying the public key;
  transmitting a request corresponding to said individual certification request to a certification authority 12, which issues a certificate in accordance with said request.

The search in the central security base 7 is performed periodically. The periodic wakeup mechanism 6 periodically activates the local registration authority 5. The activation period of the local registration authority 5 can be modified by the administrator.

According to one particular embodiment of the invention, the local registration authority 5 activated by the periodic wakeup mechanism 6 searches for all the multiple requests for certifying public keys stored in the central security base 7 wherein the scheduling attribute corresponds to an execution date that has arrived or passed. The local registration authority 5 gives the attribute relative to the status of the multiple request in question the value "pending."

For each of the multiple certification requests found, the local registration authority 5 searches for all of the subjects involved in the request in question for which a condition in which it is necessary to certify at least one pair of keys is fulfilled (lack of a certificate and a corresponding individual certification request, expiration of the validity period of the certificate during the activation period of the local registration authority 5, revocation of the certificate). The condition "certification requested by an administrator" is only considered when an administrator requests a new certificate for a given pair of keys through the man/machine interface, as will be seen below. For each subject found, it creates individual requests for certifying pairs of keys from the multiple certification requests in question. To do this, the local registration authority 5 communicates with the central security base 7. It retrieves from the central security base 7 the information it needs to construct each of said individual requests, including the model certificate. The multiple request indicates the model certificate to be used, based on the set in which the pair of keys in question is found. The model certificate specifically contains the certification authority and the extensions. From the extensions, the local registration authority 5 obtains the encoding rules that make it possible to encode the data to be entered into the certificate. It applies said rules in order to encode the extensions into the certificate contained in the individual certification request in question. The local registration authority 5 gives the attribute relative to the status of the individual request in question value "in progress."

Several individual requests for certifying a pair of keys can be created for a given subject. Each individual request corresponds to a given certification authority and hence to a particular model certificate.

The administrator can, at any time, request the certification of a given pair of keys from the man/machine interface 4; the administrator enters all the information necessary to the creation of an individual request, including the model certificate; the authority can then directly create said individual certification request for the given subject. The condition "certification requested by an administrator," in which it is necessary to create at least one certificate, is fulfilled. It gives the attribute relative to the status of the individual request in question the value "in progress." The process then works as described below.

Once the individual requests have been created for each subject found, the local registration authority 5 deletes from the central security base 7 the object "multiple requests for certifying pairs of keys" when the scheduling attribute requires it, i.e., when it indicates that the multiple request in question should be executed only once.

The local registration authority 5 sends one certification request per individual certification request created to the certification authority 12 in question. The content of the certification request corresponds to that of the individual certification request; only its structure is modified so as to be adapted to the communication means used to connect the local registration authority 5 to the certification authority 12. The certification request is signed with the private key of the local registration authority 5 in order to guarantee the source of the request. The status of each certification request is then updated; the local registration authority 5 gives the attribute of the individual certification request relative to the status of the procedure the value "sending a request." The certification authority 12 stores the request. The certification authority 12 is capable at any time of producing a certificate signed with its private key. The mode of connection between the certification authority 12 and the local registration authority 5 can be synchronous or asynchronous. In an asynchronous mode, the local registration authority 5 comprises means for processing certificates as they are received.

In the event that the certification authority 12 does not succeed in creating, or refuses to create, a certificate, it transmits an error message to the local registration authority 5. The local registration authority 5 changes the value of the attribute of the individual request in question relative to the status of the certification to give it the value "process ended with an error message."

Upon reception of the certificate in question, the local registration authority 5 changes the value of the attribute of the individual request in question relative to the status of the certification to give it the value "process done." The local registration authority 5 destroys the corresponding individual certification request and creates an object of the certificate type in the central security base 7.

The subjects stored in the central security base 7 that are equipped with pairs of keys and lack certificates, or for which a new certificate has been requested, or whose certificate expires during the activation period of the local registration authority 5, or whose certificate has been revoked, are automatically provided by the process according to the invention with certificates, new certificates, or renewed certificates, respectively.

The man/machine interface 4 of the central management service 3 is provided with a trace function. The trace function enables the administrator to trace the various steps of the process according to the invention and to intervene if a deadlock occurs during the creation or certification of a pair of keys. When the administrator wishes to, he calls the trace function of the man/machine interface 4; the trace function searches in the central security base 7 for all the individual requests currently in progress and communicates them to the administrator. The administrator can read, using the trace function of the man/machine interface, the attribute relative to the status of the creation of a pair of keys as well as well as the attribute relative to the status of the certification. When the attribute has the value "process ended with an error message," the administrator can delete the request in question or re-send it.

At any time, the administrator, using the man/machine interface 4, can request the creation of a pair of keys and/or the certification of a pair of keys for a given subject. In this case, the wakeup mechanism 6 activates the local registration authority as soon as the creation request and/or the creation and certification request has been entered by the administrator.

Other embodiments of the process and the system according to the present invention are conceivable.

For example, the local registration authority 5 can search for all of the subjects for which of keys must be produced, then search for the associated multiple requests.

The process according to the present invention therefore consists of:
  searching in storage means 7 for at least one subject for which a pair of asymmetric keys and an associated certificate must be created;
  creating at least one individual request for creating and certifying a pair of asymmetric keys for said subject;
  transmitting a request corresponding to said individual creation and certification request to a key generating center 8, which issues a pair of asymmetric keys in accordance with said request;
  creating at least one individual request for certifying the public key created for said subject;
  transmitting a request corresponding to said individual certification request to a certification authority 12, which issues a certificate in accordance with said request.

A pair of keys must be created for a given subject when said subject lacks a pair of keys and a corresponding individual creation and certification request, or when a pair of keys has been requested for said subject, or when the certificate of a pair of keys for said subject intended for an identical use has been revoked and a new pair of keys has been requested.

The process is executed periodically.

It creates each individual request from a corresponding multiple creation and certification request stored in the storage means 7 relative to a set of subjects belonging to a preset list or to a set of subjects defined by predetermined criteria, as well as to model pairs of keys and associated model certificates for the set in question.

The process consists of searching in each of the multiple creation and certification requests of the system for all of the subjects in a condition such that a pair of keys must be created.

The process according to the present invention also consists of:
  searching in storage means 7 for at least one pair of asymmetric keys for which a certificate must be created;
  creating at least one individual request for certifying the public key;
  transmitting a request corresponding to said individual certification request to a certification authority 12, which issues a certificate in accordance with said request.

A certificate must be created for a given subject when said subject lacks a certificate and an individual certification request, or when a certificate has been requested for said subject, or when the certificate of a pair of keys for said subject expires, or when the certificate of a pair of keys has been revoked.

The process is executed periodically.

A certificate must be created for a given subject when the certificate expires during said period.

The process creates each individual request from a corresponding multiple certification request stored in the storage means 7 relative to a set of pairs of keys for subjects belonging to a preset list or to a set of pairs of keys for subjects defined by predetermined criteria, as well as to model certificates associated with the set in question.

The process consists of searching in each of the multiple certification requests of the system for all of the subjects in a condition such that a certificate must be created.

Each multiple request comprises an attribute relative to at least one execution date, and the process according to the invention consists of including in the search only the multiple requests whose execution date has arrived.

The process according to the invention consists of performing the encoding of one or more extensions in accordance with one or more of the given rules and of entering the encoded extension or extensions into the individual certification request during the creation of the latter.

It also consists of changing the value of an attribute contained in each of the individual requests to indicate its status.

The present invention also relates to the computer system 1 that makes it possible to create and manage objects, particularly pairs of asymmetrical cryptographic keys and certificates associated with the pairs of keys, the pairs of keys and the certificates being intended for subjects managed by said system, characterized in that it comprises means for automating the creation and/or certification of at least one pair of keys for each subject managed by the system 1.

The system 1 comprises at least:
  a central management service 3 capable of creating, updating and consulting the objects and the subjects managed by said system;
  a local registration authority 5 capable of handling the creation and/or certification of keys intended for an object;
  a central security base 7 containing the subjects and objects managed by the system with which the local registration authority communicates;
  a key generating center 8 capable of creating at least one pair of keys at the request of the local registration authority 5 with which it communicates;
  the system 1 having access to at least one certification authority 12 capable of creating a certificate at the request of the local registration authority 5.

It comprises a mechanism 6 for periodically waking up the local registration authority 5.

The present invention also relates to a process for creating and managing symmetrical cryptographic keys, each key being intended for a subject managed by a computer system 1, characterized in that it consists of:
  searching in storage means 7 for at least one subject for which a symmetric key must be created;
  creating at least one individual request for creating a symmetric key for said subject;

transmitting a request corresponding to said individual creation request to a key generating center 8, which issues a symmetric key in accordance with said request.

It relates to the computer system 1 that makes it possible to create and manage objects, particularly symmetrical cryptographic keys, the keys being intended for subjects managed by said system, in that it comprises means for automating the creation of at least one key for each subject managed by the system 1.

Thus, the process and the system according to the invention make it possible to automatically create and manage cryptographic keys and their associated certificates in the case of asymmetric keys. They also make it possible to avoid having to create individual requests for each user and thus to lessen the workload of the administrator. The multiple requests simplify the creation and the management of public/private keys.

The management of the certification of public keys is guaranteed in spite of the asynchronous mode of communication between the certification authority 12 and the server 2.

The expiration time of the certificates is monitored in order to ensure an automatic renewal of the certificates.

The extensions are processed by the system 1.

The monitoring of the creation and certification of pairs of keys is possible by means of the entral management service, and more particularly the man/machine interface.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims

What is claimed:

1. A method for creating and managing symmetrical cryptographic keys, wherein a symmetrical cryptographic key can be used to both encode and decode data, and wherein each key is intended for a user managed by a computer system comprising:

searching in storage means for at least one user for which a symmetric key must be created, each user associated with one or more attributes comprising a status attribute and a scheduling attribute, wherein said status attribute is capable of having any one of the following values: pending, in progress, process ended with an error message, process done, sending a creation request and done;

creating, based on said one or more attributes, at least one individual creation request for creating a symmetric key for said user, said creating further comprising periodically executing said individual creation request based on said scheduling attribute;

transmitting a key generating request corresponding to said individual creation request to a key generating center;

issuing, by said key generating center, a symmetric key in accordance with said transmitted key generating request; and creating each of said individual creation requests from a corresponding multiple creation request recorded in the storage means relative to a set of users belonging to a preset list, or to a set of users defined by predetermined criteria, as well as relative to model pairs of keys for either of said sets of users.

2. The method according to claim 1, wherein said multiple creation request is associated with a plurality of levels having relationships according to a tree structure.

3. The method according to claim 1, wherein said predefined criteria are associated with at least one of a geographic and an organizational criteria.

4. The method according to claim 1, further comprising tracing the status of each said individual creation request.

5. A computer processing system including a storage means for creating symmetrical cryptographic keys, wherein a symmetrical cryptographic key can be used to both encode and decode data, and wherein said computer processing system manages users, said computer processing system comprising:

a key generating center for creating at least one key at the request of a local registration authority with which the key generating center communicates;

a wake up mechanism; and a key server configured to create at least one key for each user based on one or more attributes associated with said user, wherein said one or more attributes comprises a status attribute capable of having any one of the following values: pending, in progress, process ended with an error message, process done, sending a creation request and done;

wherein said one or more attributes further comprises a scheduling attribute for indicating that said symmetric key is periodically generated responsive to said wake up mechanism; and wherein said computer processing system is configured to form said created request of a local registration authority by creating each individual creation request from a corresponding multiple creation request recorded in the storage means relative to a set of users belonging to a preset list, or to a set of users defined by predetermined criteria, as well as relative to model pairs of keys for either of said sets of users.

6. The computer processing system according to claim 5, wherein said multiple creation request is associated with a plurality of levels having relationships according to a tree structure.

7. The computer processing system according to claim 5, wherein said predefined criteria are associated with at least one of a geographic and an organizational criteria.

8. The computer processing system according to claim 5, further comprising a central management service configured to trace the status of each said individual creation request.

9. A non-transitory computer readable medium upon which is embodied a set of programmable instructions which, when executed by a processor, cause the processor to perform operations for creating and managing symmetrical cryptographic keys, wherein a symmetrical cryptographic key can be used to both encode and decode data, and wherein each key is intended for a user managed by a computer system, comprising:

searching in storage means for at least one user for which a symmetric key must be created, each user associated with one or more attributes comprising a status attribute and a scheduling attribute, wherein said status attribute is capable of having any one of the following values: pending, in progress, process ended with an error message, process done, sending a creation request and done;

creating, based on said one or more attributes, at least one individual creation request for creating a symmetric key for said user, said creating further comprising periodically executing said individual creation request based on said scheduling attribute;

transmitting a key generating request corresponding to said individual creation request to a key generating center;

issuing, by said key generating center, a symmetric key in accordance with said transmitted key generating request; and creating each of said individual creation requests from a corresponding multiple creation request recorded in the storage means relative to a set of users belonging to a preset list, or to a set of users defined by predetermined criteria, as well as relative to model pairs of keys for either of said sets of users.

10. The non-transitory computer readable medium according to claim 9, wherein said multiple creation request is associated with a plurality of levels having relationships according to a tree structure.

11. The non-transitory computer readable medium according to claim 9, wherein said predefined criteria are associated with at least one of a geographic and an organizational criteria.

12. The non-transitory computer readable medium according to claim 9, further comprising tracing the status of each said individual creation request.

* * * * *

UNITED STATES PATENT AND TRADEMARK OFFICE
CERTIFICATE OF CORRECTION

| | | |
|---|---|---|
| PATENT NO. | : 7,822,208 B2 | |
| APPLICATION NO. | : 11/723372 | |
| DATED | : October 26, 2010 | |
| INVENTOR(S) | : Pierre Calvez, Brigitte Courtaux and Jacques Lebastard | |

It is certified that error appears in the above-identified patent and that said Letters Patent is hereby corrected as shown below:

Insert the following:

Column 15 – Line 61, delete "request is" and insert --requests are--.

Column 16 – Line 29, delete "pairs of".

Column 16 – Line 32, delete "request is" and insert --requests are--.

Column 17 – Line 6, delete "request is" and insert --requests are--.

Signed and Sealed this
Twenty-second Day of March, 2011

David J. Kappos
*Director of the United States Patent and Trademark Office*